US006937786B2

(12) United States Patent
Lemoff

(10) Patent No.: US 6,937,786 B2
(45) Date of Patent: Aug. 30, 2005

(54) PARALLEL MULTIWAVELENGTH OPTICAL SUBASSEMBLY

(75) Inventor: Brian E. Lemoff, Union City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 51 days.

(21) Appl. No.: 10/754,131

(22) Filed: Jan. 9, 2004

(65) Prior Publication Data

US 2005/0152640 A1     Jul. 14, 2005

(51) Int. Cl.[7] .............................................. G02B 6/293
(52) U.S. Cl. ...................................... 385/24; 385/114
(58) Field of Search .................................. 385/24, 114

(56) References Cited

U.S. PATENT DOCUMENTS

| | | | |
|---|---|---|---|
| 5,894,535 A | 4/1999 | Lemoff et al. | |
| 6,117,699 A | 9/2000 | Lemoff et al. | |
| 6,198,864 B1 | 3/2001 | Lemoff et al. | |
| 6,259,121 B1 | 7/2001 | Lemoff et al. | |
| 6,282,337 B1 | 8/2001 | Horwitz et al. | |
| 6,341,023 B1 | 1/2002 | Puc | |
| 6,351,027 B1 | 2/2002 | Giboney et al. | |
| 6,385,374 B2 | 5/2002 | Kropp | |
| 6,539,142 B2 | 3/2003 | Lemoff et al. | |
| 6,652,161 B2 | 11/2003 | Grann et al. | |
| 2003/0152113 A1 | 8/2003 | Knopp | |

FOREIGN PATENT DOCUMENTS

EP     0 343 290 A1     5/1988

OTHER PUBLICATIONS

Ali, Mohammed E. et al. Demonstration of a High Density Parallel–WDM Optical Interconnect. Lasers and Electro–Optics Society. 2004. vol. 2, pp. 459–460.*

Lemoff, Brian E. et al. Demonstration of a Compact Low–Power 250–Gb/s Parallel–WDM Optical Interconnect. Jan. 2005. Photonics Technology Letters. vol. 17, issue 1, pp. 220–222.*

Lemoff, Brian E. Compact Optical Interconnects for 100–Gb to 1–Tb/s Data Links. 2003. CLEO. p. 2.*

(Continued)

*Primary Examiner*—John D. Lee
*Assistant Examiner*—Rhonda S. Peace

(57) ABSTRACT

A parallel optics and wavelength division multiplexing package for multiplexing optical data signals for transmission, or for receiving and demultiplexing optical data signals. The package includes an array of diodes mounted on a parallel transmitter or receiver circuit for receiving electrical signals from the circuit and converting them into an array of corresponding light signals, or for receiving an array of light signals and converting them into an array of corresponding electrical signals. In a transmitter package, an optical multiplexer, located adjacent the array of diodes, receives the array of light signals and converts them into a set of corresponding parallel multiplexed light signals. In a receiver package, an optical demultiplexer, located adjacent the array of diodes, receives a set of parallel multiplexed light signals and converts them into the array of demultiplexed light signals. A lid mounted on the optical multiplexer or demultiplexer includes alignment pins for aligning the multiplexer or demultiplexer with a parallel fiber ribbon for transmitting or receiving the light signals. The package can include an hermetic or non-hermetic enclosure, depending upon the materials used within the package.

24 Claims, 5 Drawing Sheets

OTHER PUBLICATIONS

Katsuki Suematsu; Masao Shinoda; Takashi Shigenaga; Jun Yamakawa; Masayoshi Tsukamoto; Yoshimi Ono and Takayuki Ando, Super Low-Loss, Super High-Density Multi-Fiber Optical Connectors, Furukawa Review No. 23, 2003, pp. 53-58.

Koichi Maeno; Takahiro Ueno; Masato Shiino; Yutaka Arai; Kazuhiro Takayama; Katsuki Suematsu; Masao Shinoda; Koichi Takagi; Hiroyuki Yamada and Kiyoshi Midorikawa, Development of Mini-MT Ferrule Using Short-Cycle Injection Molding, Furukawa Review, No. 19, 2000, pp. 143-148.

NGK Insulators; Application Note: Fiber Ribbon For Parallel Optical Interconnects; MTP is a registered trademark of US Conec, LTd, pp. 2.

* cited by examiner

PARALLEL MULTIWAVELENGTH OPTICAL SUBASSEMBLY

FIELD OF THE INVENTION

The present invention relates to an apparatus and method for multiplexing light signals for transmission, or for receiving and demultiplexing light signals.

BACKGROUND OF THE INVENTION

Parallel Optics and Wavelength Division Multiplexing (WDM) are two optical communications techniques that enable increased bandwidth density in communications systems. In Parallel Optics, multiple optical data signals are transmitted along a multi-fiber ribbon, with a single optical signal being transmitted in each fiber. In WDM, multiple optical data signals are combined and transmitted along a single optical fiber, with each optical signal being carried on a different wavelength. In Parallel WDM (PWDM), the two techniques are combined by transmitting multiple optical wavelengths through each fiber of a parallel fiber ribbon.

A need exists for a compact and inexpensive device, for example, to implement PWDM in order to combine and transmit multiple optical signals.

SUMMARY OF THE INVENTION

Embodiments in accordance with the invention provide for parallel multiwavelength transmission and reception of light signals. The apparatus and method include an array of diodes mounted on a circuit for receiving electrical signals from the circuit and converting them into an array of corresponding light signals, for receiving an array of a plurality of light signals and converting them into corresponding electrical signals. An optical multiplexer or demultiplexer, located adjacent the array of diodes, receives the array of light signals and converts them into a set of corresponding parallel multiplexed light signals, or receives a set of parallel multiplexed light signals and converts them into the array of the plurality of light signals.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
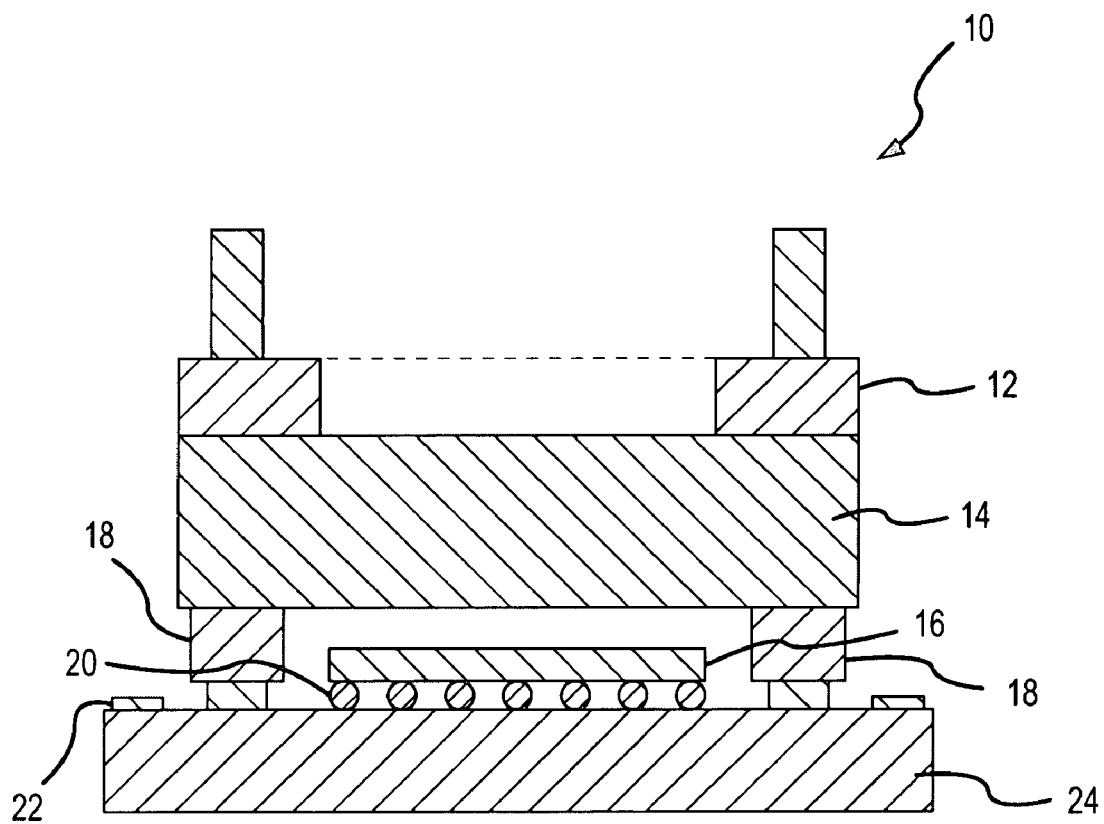
FIG. 1 is a side view of an exemplary PWDM apparatus for multiplexing light signals for transmission, or for receiving and demultiplexing light signals in accordance with the invention.
Figure 2:
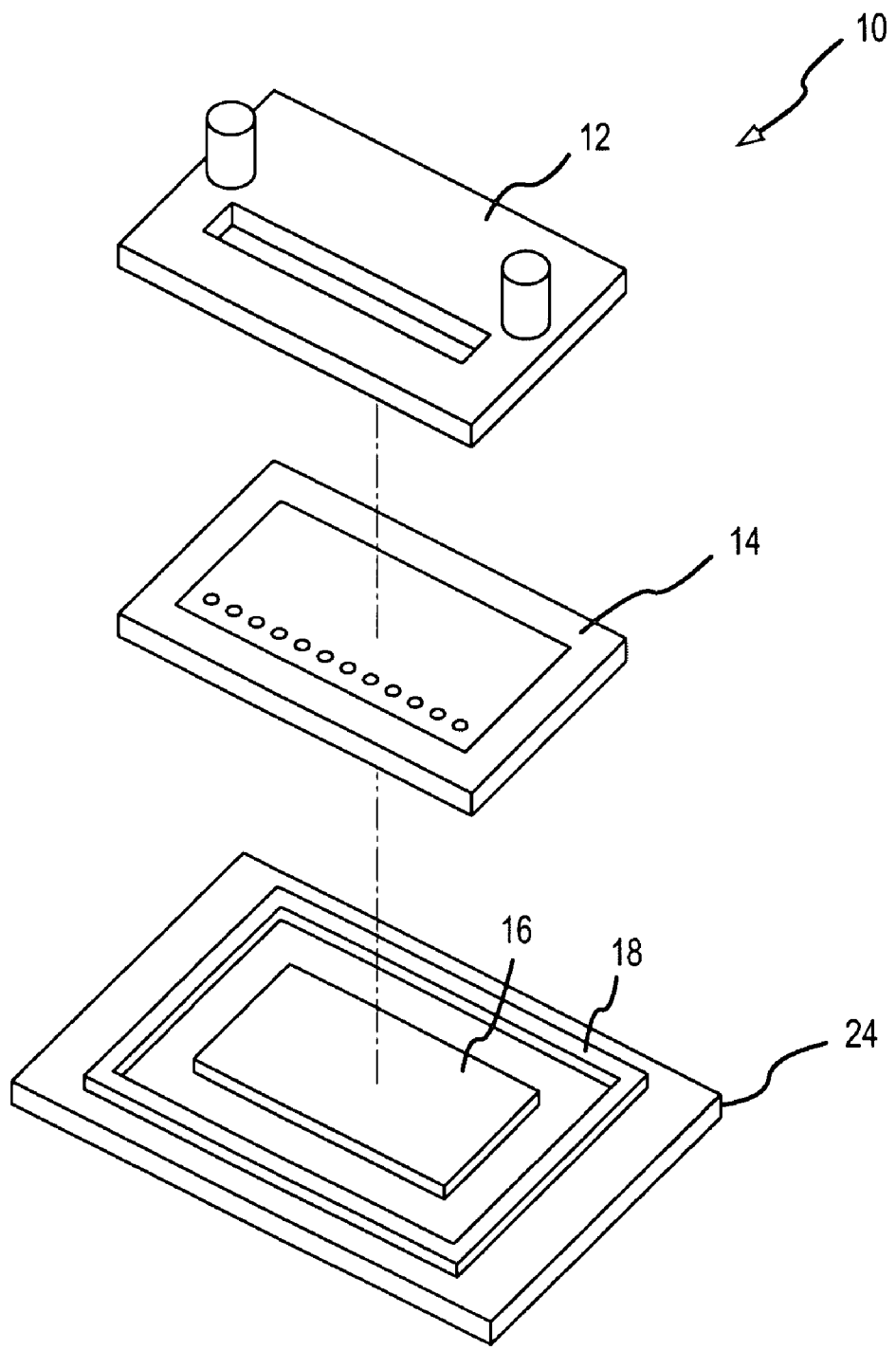
FIG. 2 is a perspective view of the exemplary PWDM apparatus in accordance with the invention.

Embodiments in accordance with the invention provide for a parallel multiwavelength optical subassembly (PMOSA). Embodiments can include either a transmitter (Tx) or receiver (Rx) subassembly that enables a PWDM solution to be extremely compact and low cost. FIG. 1 is a side view of an exemplary PWDM apparatus 10 for this subassembly in order to multiplex light signals for transmission, or to receive and demultiplex light signals. The side view of FIG. 1 shows only one "slice" (cross-section) of the apparatus, and implementations include arrays of components, as further described below. FIG. 2 is a perspective exploded view of the exemplary apparatus 10. Light signals can include any type of optical data signal.

As shown in FIG. 1, apparatus 10 includes a parallel Tx or Rx integrated circuit (IC) 24, and such ICs are known in the art. IC 24 includes bond pads 22 for electrical communication with the circuitry within it. Vertical Cavity Surface Emitting Lasers (VCSELs) or PIN photodiode arrays 16 sit on top of IC 24 and solder balls 20, providing electrical communication between the circuitry in IC 24 and arrays 16. In an Rx circuit, the photodiodes can also be implemented with, for example, MSM photodiodes or any other type of photodetector. In a Tx circuit, the optical sources can also be implemented with, for example, any laser that can emit light perpendicular to the IC, or an edge-emitting laser with a turning mirror. Also, certain embodiments do not necessarily require an IC and can instead use another electronic submount such as a piece of silicon, Gallium arsenide, or Indium phosphide with electrical traces.

PWDM multiplexer or demultiplexer optics 14 are positioned over arrays 16 and held in place by a spacer 18 positioned between optics 14 and IC 24. In certain embodiments, spacer 18 can provide for an hermetic seal between optics 14 and IC 24 by being composed of an hermetic material and surrounding the enclosed space between optics 14 and IC 24. A lid 12 includes alignment pins in order to align optics 14 with an optical transmission medium such as a parallel fiber ribbon. One example of a fiber ribbon connector to accomplish this alignment is the MT ferrule connector. Alternatively, any type of mechanical features can be used to connect optics 14 with a fiber ribbon or other parallel terminations for transmitting light signals. The apparatus 10 can be manufactured as a chip-mounted enclosure, an example of which is described in U.S. Pat. No. 6,351,027, incorporated herein by reference.

The embodiment shown in FIGS. 1 and 2 can include, for example, two types of implementations, hermetic and non-hermetic embodiments. In the hermetic embodiment, the PMOSA is a chip-mounted enclosure. In this case, the PMOSA comprises IC 24 (a multichannel Tx or Rx circuit), the VCSEL or photodiode arrays 16 flip-chip mounted on top of the IC 24, a wall (spacer 18 composed of metal or silicon, for example) for hermetic encapsulation, the optical component 14 (implemented in a material impervious to moisture), for combining or separating wavelengths and coupling between the fibers and the optoelectronic components, and the mechanical lid 12 for aligning the optical signals to a fiber ribbon via the alignment pins. If the ICs, wall, optics, and lid are fabricated as wafers of components that align to each other, then the alignment and assembly of these components can be accomplished on a wafer scale, dramatically reducing the cost of the PMOSA.

The wall (spacer 18 bonded and forming a barrier between optical element 14 and IC 24) in this hermetic embodiment can be composed of, for example, silicon, metal, ceramic, or glass. The lid may be composed of any of those materials for the wall, for example. The multiplexer and demultiplexer in this hermetic embodiment can be composed of, for example, glass, Gallium arsenide, Gallium Phosphide, silicon, Indium Phosphide, or any hermetic material optically transparent at the wavelengths of the VCSELs.

In the non-hermetic embodiment, the PMOSA is not necessarily hermetically sealed. In this case, the PMOSA includes IC 24 (a multichannel Tx or Rx circuit), the VCSEL or photodiode arrays 16 flip-chip mounted on top of the IC 24, and a molded plastic optical component 14 for combining or separating the optical wavelengths and coupling between the fibers and the optoelectronic components. This plastic component may also include mechanical features for aligning the optical signals to a fiber ribbon, via the alignment pins, and for attaching the plastic component to the IC 24 (spacer 18 composed of plastic, for example).

The wall (spacer 18) in this non-hermetic embodiment can be composed of, for example, plastic, silicon, metal, ceramic, or glass. The lid may be composed of any of those materials for the wall, for example. The multiplexer and demultiplexer in this non-hermetic embodiment can be composed of, for example, plastic, glass, Gallium arsenide, Gallium phosphate, a semiconductor, silicon, Indium, or any possibly non-hermetic material optically transparent at the wavelengths of the VCSELs.

The optical component used in a PMOSA can belong to one of two general families, for example: zigzag and splitter/combiner. In zigzag optical multiplexers and demultiplexers, light of different wavelengths is combined or separated through successive bounces on dielectric interference filters, which transmit one wavelength and reflect other wavelengths. In a splitter/combiner device, the optics function to either split a single input optical beam into multiple equal output beams, or to combine multiple input optical beams into a single output optical beam. When used as a combiner, such a device is typically wavelength insensitive. When used as a splitter, the wavelength insensitive optics will be combined with wavelength filters associated with each detector to transmit only the desired wavelength.

Figure 3:
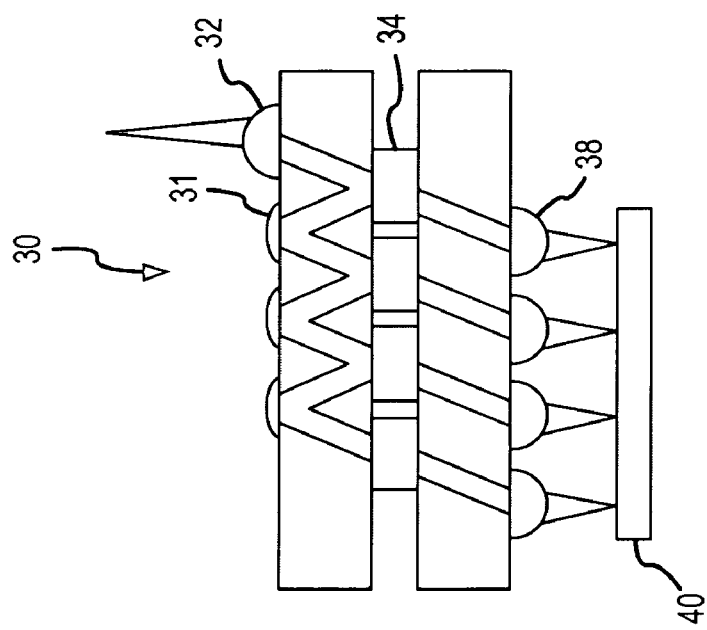
FIG. 3 is a diagram illustrating an optical zigzag multiplexer or demultiplexer in accordance with the invention.

FIG. 3 is a diagram illustrating an optical zigzag multiplexer or demultiplexer 30 as one implementation of optics 14. In zigzag component 30, light filters 34 are positioned between refractive optical element (ROE) asphere lens arrays 32 (1×12 array) and 38 (4×12 array). The filters 34 filter light at particular wavelengths to demultiplex light signals from lens array 32 through successive bounces of the light signals off asphere mirrors 31 (3×12 array) and through filters 34, and to provide the demultiplexed light signals to a PIN array 40 (4×12 array corresponding with array 16 in FIG. 1). For a transmitter (multiplexer) embodiment, the filters 34 can multiplex light signals from array 40 and provide the multiplexed light signals to lens arrays 32. ROE asphere lenses 38 focus the light signals onto PIN array 40 for demultiplexing, or can receive light signals from VCSEL array 40 for multiplexing. For a demultiplexer embodiment, lens array 38 is integrated into the substrate-side of the PIN photodiode array 40, rather than being integrated into the demultiplexer. This configuration reduces the overall PMOSA complexity and improves the alignment tolerance of the demultiplexer relative to the photodiode array.

Examples of zigzag multiplexers or demultiplexers for single-fiber applications are described in U.S. Pat. Nos. 5,894,535 and 6,198,864, both of which are incorporated herein by reference. A PMOSA, as described in this specification, can use parallel versions of those zigzag multiplexers or demultiplexers.

Figure 4:
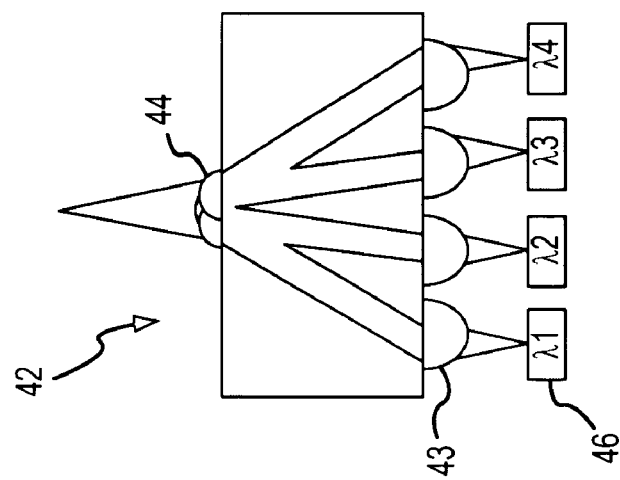
FIG. 4 is a diagram illustrating an optical combiner multiplexer in accordance with the invention.

FIG. 4 is a diagram illustrating an optical combiner multiplexer 42 as one implementation of optics 14 for a Tx embodiment of apparatus 10. In multiplexer 42, VCSEL arrays 46 (4–1×12 arrays corresponding with array 16 in FIG. 1) provide light signals to ROE asphere lens arrays 43 (4×12 array), which focus the individual light signals onto lens arrays 44 (12–2×2 arrays) to be optically combined for transmission via a fiber optic ribbon aligned with the optics using the alignment pins on lid 12.

Figure 5:
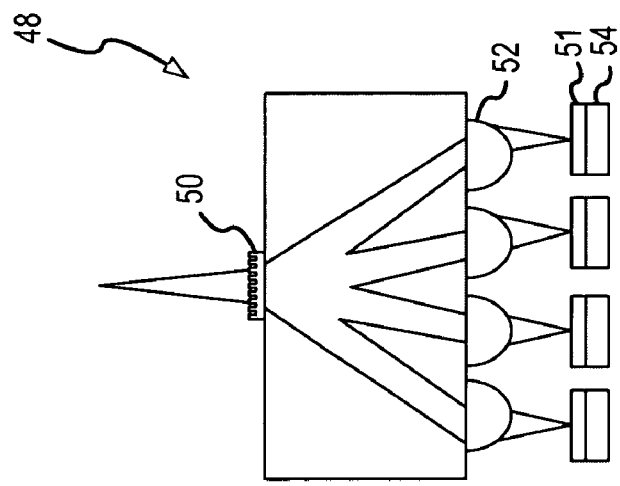
FIG. 5 is a diagram illustrating an optical splitter demultiplexer in accordance with the invention.

FIG. 5 is a diagram illustrating an optical splitter demultiplexer 48 as one implementation of optics 14 for a Rx embodiment of apparatus 10. In demultiplexer 48, an optical splitter array 50 (1×12 array) receives multiplexed light signals from the fiber ribbon, aligned with the optics via the alignment pins on lid 12, and it transmits the light signals to ROE asphere lens arrays 52 (4×12 array), which then focuses the demultiplexed light signals onto PIN arrays 54 (4–1×12 arrays corresponding with array 16 in FIG. 1). Each of PIN arrays 54 includes a wavelength filter 51 that allows a desired wavelength to pass, while blocking undesired wavelengths of light.

The numbers identifying the sizes of the various arrays in FIGS. 3–5 are provided for illustrative purposes only for these exemplary embodiments. Other embodiments can include arrays of different sizes. For example, other embodiments in accordance with the invention can use 4, 6, or 8 wavelengths and fiber ribbons having 4, 12, 24, or 48 fibers. Also, any number of wavelengths and signals can be used in particular implementations, as well as with a variety of materials such as the examples provided above. Moreover, each of the FIGS. 3–5 illustrates only one input/output in a side view for the multiplexers and demultiplexers.

Figure 6:
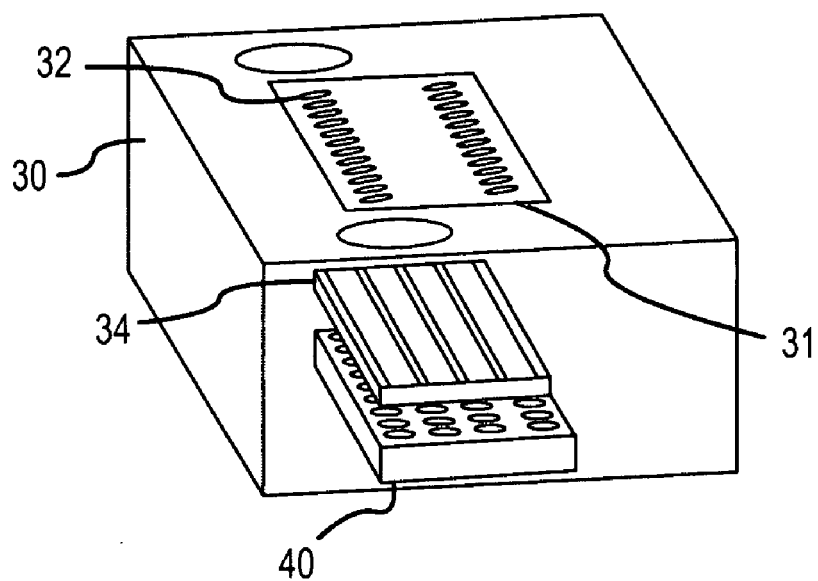
FIG. 6 is a diagram illustrating an optical demultiplexer aligned to a lensed photodiode array in accordance with the invention.
Figure 7:
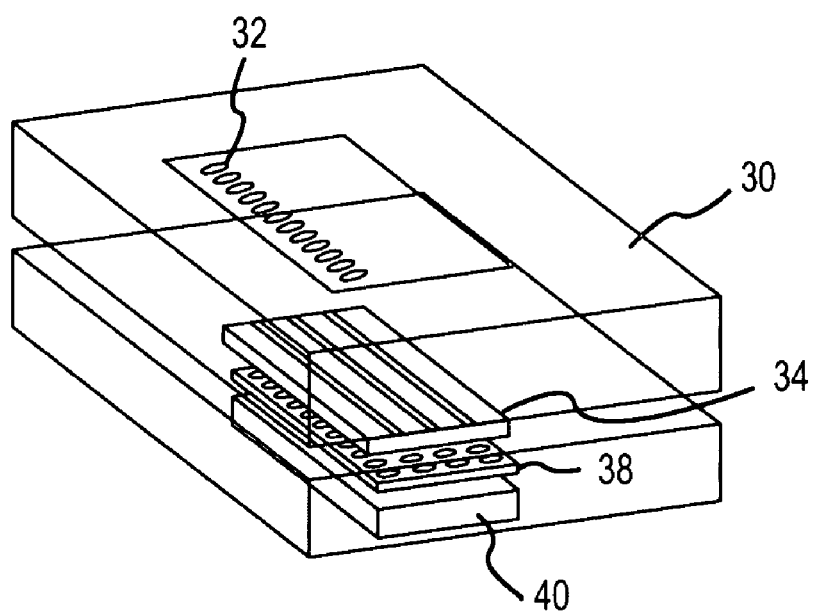
FIG. 7 is a diagram illustrating an optical multiplexer aligned to a VCSEL array in accordance with the invention.

The three-dimensional nature of the arrays for the multiplexers and demultiplexers are illustrated in FIGS. 6 and 7. FIG. 6 is a diagram illustrating the three-dimensional embodiment of an optical demultiplexer, zigzag slab 30 with attached wavelength filters 34, aligned to a lensed photodiode array. In the demultiplexer embodiment, lenses 32 function as input lenses, and array 40 functions as a detector array. FIG. 7 is a diagram illustrating the three-dimensional embodiment of an optical multiplexer, zigzag slab 30 with attached wavelength filters 34 and attached lens array 38, aligned to a VCSEL array. In the multiplexer embodiment, lenses 32 function as output lenses, and array 40 functions as the VCSEL arrays.

Figure 8:
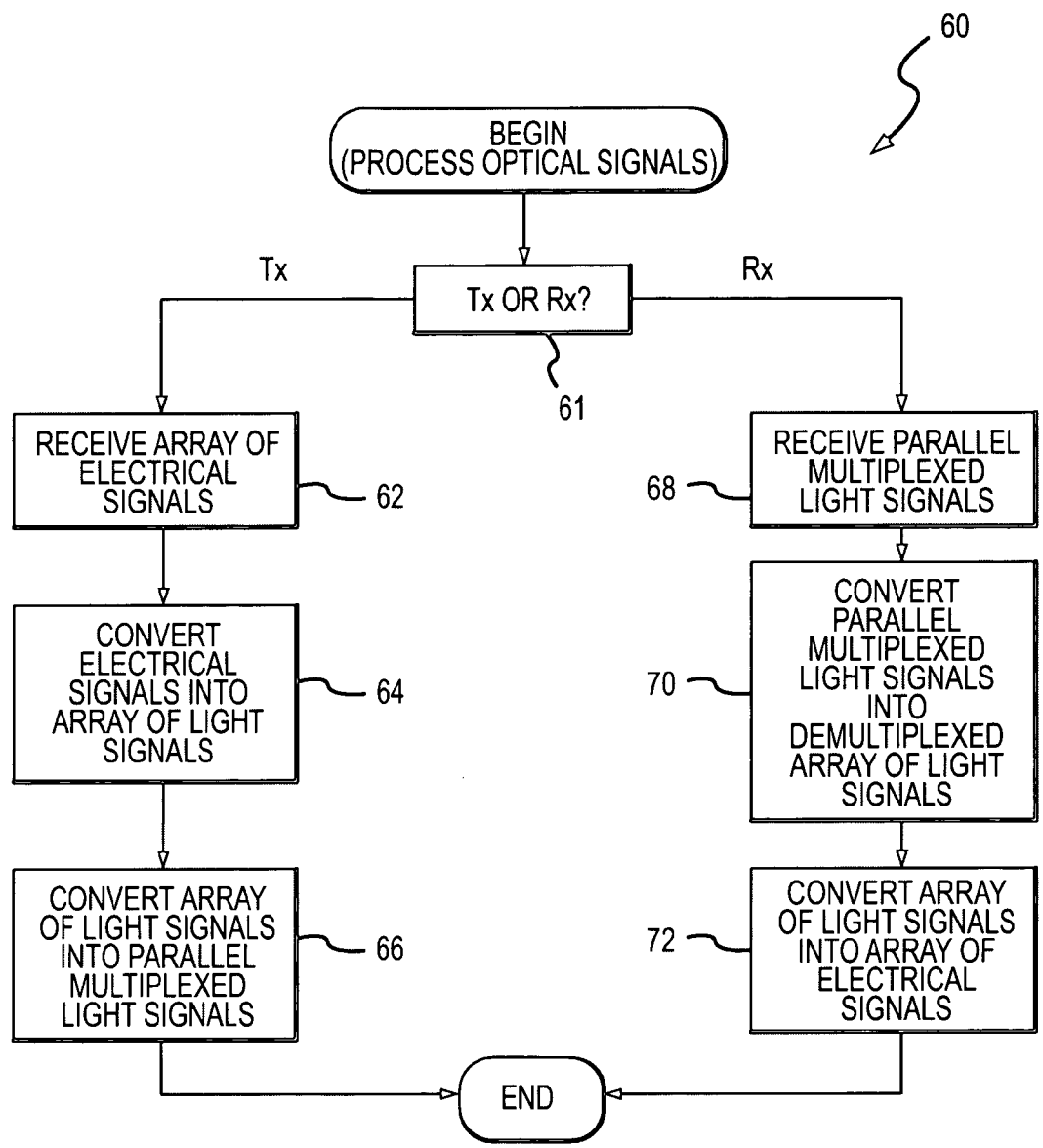
FIG. 8 is a flow chart of a method for processing optical signals in accordance with the invention.

FIG. 8 is a flow chart of a method 60 for processing optical signals in accordance with the invention using, for example, the apparatus described above. Method 60 determines whether a transmission (Tx) routine or reception routine (Rx) is to be executed (step 61). In the Tx routine, an array of electrical signals is received (step 62) and converted into an array of light signals (step 64). The array of light signals are then converted into parallel multiplexed light signals for transmission (step 66).

In the Rx routine, parallel multiplexed light signals are received (step 68) and converted into an array of demultiplexed light signals (step 70). The array of light signals are then converted into an array of electrical signals for reception by an IC or other component (step 72). Other steps may also be incorporated into method 60 depending upon a particular implementation.

Embodiments in accordance with the invention can be used for a variety of applications as an optical interconnect product. For example, they can be used for ultra-short reach transmission of signals for chip-to-chip, board-to-board, or rack-to-rack (in-room) transmission of high volumes of data. They can also be used for high speed transmission (for example, 100 gigabits/second) of high volumes of data between processors in multi-processor systems or between large routers in networking systems. As yet another example, they can be used as optical backplanes and high-speed board-to-board interconnects in systems. Other applications are also possible, depending upon particular implementations.

While the present invention has been described in connection with exemplary embodiments, it will be understood that many modifications will be readily apparent to those skilled in the art, and this application is intended to cover any adaptations or variations thereof. For example, various types of optical components, materials for the optical multiplexer and demultiplexer, and materials to create an enclosure in the package may be used without departing from the scope of the invention. This invention should be limited only by the claims and equivalents thereof.

What is claimed is:

1. An apparatus for providing parallel multiwavelength transmission of optical signals, comprising:
    an array of diodes, mounted on a circuit, for receiving electrical signals from the circuit, and for converting the electrical signals into a plurality of corresponding light signals; and
    an optical multiplexer, located adjacent the array of diodes, for receiving the plurality of light signals and converting the plurality of light signals into a set of corresponding parallel multiplexed light signals.

2. The apparatus of claim 1, further including a lid mounted on the optical multiplexer and providing for alignment of the optical multiplexer with an optical transmission medium for transmitting the parallel multiplexed light signals.

3. The apparatus of claim 1 wherein the optical multiplexer includes a zigzag optical multiplexer having a plurality of interference filters for transmitting particular wavelengths of light.

4. The apparatus of claim 1 wherein the optical multiplexer includes a combiner multiplexer.

5. The apparatus of claim 1, further including a spacer surrounding the array of diodes and mounted between the circuit and the optical multiplexer.

6. The apparatus of claim 5 wherein the spacer and the optical multiplexer are composed of an hermetic material.

7. The apparatus of claim 5 wherein the spacer and the optical multiplexer are composed of a non-hermetic material.

8. An apparatus for receiving parallel multiwavelength transmission of optical signals, comprising:
    an array of diodes, mounted on a circuit, for receiving a plurality of light signals and for converting the plurality of light signals into a plurality of corresponding electrical signals; and
    an optical demultiplexer, located adjacent the array of diodes, for receiving a set of parallel multiplexed light signals and for converting the set of parallel multiplexed light signals into the plurality of light signals.

9. The apparatus of claim 8, further including a lid mounted on the optical demultiplexer and providing for alignment of the optical demultiplexer with an optical transmission medium for receiving the parallel multiplexed light signals.

10. The apparatus of claim 8 wherein the optical demultiplexer includes a zigzag optical demultiplexer having a plurality of interference filters for transmitting particular wavelengths of light.

11. The apparatus of claim 8 wherein the optical demultiplexer includes a splitter demultiplexer.

12. The apparatus of claim 8, further including a spacer surrounding the array of diodes and mounted between the circuit and the optical demultiplexer.

13. The apparatus of claim 12 wherein the spacer and the optical demultiplexer are composed of an hermetic material.

14. The apparatus of claim 12 wherein the spacer and the optical demultiplexer are composed of a non-hermetic material.

15. A method for providing parallel multiwavelength transmission of optical signals, comprising:
    receiving a plurality of electrical signals from a circuit and converting the plurality of electrical signals into a plurality of corresponding light signals; and
    using an optical multiplexer to receive the plurality of light signals and convert the plurality of light signals into a set of corresponding parallel multiplexed light signals.

16. The method of claim 15, further including providing a lid mounted on the optical multiplexer for alignment of the optical multiplexer with an optical transmission medium for transmitting the parallel multiplexed light signals.

17. The method of claim 15 wherein the using step includes using a zigzag optical multiplexer having a plurality of interference filters for transmitting particular wavelengths of light.

18. The method of claim 15 wherein using step includes using a combiner multiplexer.

19. The method of claim 15, further including hermetically sealing a space between the circuit and the optical multiplexer.

20. A method for receiving parallel multiwavelength transmission of optical signals, comprising:
    receiving a plurality of light signals and converting the plurality of light signals into a plurality of corresponding electrical signals provided to a circuit; and
    using an optical demultiplexer for receiving a set of parallel multiplexed light signals and for converting the set of parallel multiplexed light signals into the plurality of light signals.

21. The method of claim 20, further including providing a lid mounted on the optical multiplexer for alignment of the optical demultiplexer with an optical transmission medium for receiving the parallel multiplexed light signals.

22. The method of claim 20 wherein the using step includes using a zigzag optical demultiplexer having a plurality of interference filters for transmitting particular wavelengths of light.

23. The method of claim 20 wherein the using step includes using a splitter demultiplexer.

24. The method of claim 20, further including hermetically sealing a space between the circuit and the optical demultiplexer.

* * * * *